(12) United States Patent
Liu

(10) Patent No.: US 11,210,996 B2
(45) Date of Patent: Dec. 28, 2021

(54) LIGHT-EMITTING DIODE DISPLAY SYSTEM AND MODULE

(71) Applicant: Wistron Corporation, New Taipei (TW)

(72) Inventor: Wei-Lun Liu, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 16/939,038

(22) Filed: Jul. 26, 2020

(65) Prior Publication Data

US 2021/0366366 A1 Nov. 25, 2021

(30) Foreign Application Priority Data

May 21, 2020 (TW) .................................. 109116908

(51) Int. Cl.
*G09G 3/32* (2016.01)
*G09G 3/20* (2006.01)

(52) U.S. Cl.
CPC .............. *G09G 3/32* (2013.01); *G09G 3/2096* (2013.01); *G09G 2320/0626* (2013.01); *G09G 2330/021* (2013.01)

(58) Field of Classification Search
USPC ....................................................... 345/212
See application file for complete search history.

(56) References Cited

U.S. PATENT DOCUMENTS

| 2005/0179616 A1* | 8/2005 | Tsuji | G09G 3/32 |
| | | | 345/2.1 |
| 2008/0226060 A1* | 9/2008 | Hazani | H04B 3/542 |
| | | | 379/413.02 |
| 2009/0251393 A1* | 10/2009 | Fan | G09G 3/2088 |
| | | | 345/82 |
| 2014/0010549 A1* | 1/2014 | Kang | H04B 10/116 |
| | | | 398/118 |
| 2015/0153795 A1* | 6/2015 | Chen | G06F 1/3215 |
| | | | 713/1 |
| 2015/0242049 A1* | 8/2015 | Tsukahara | G06F 3/0416 |
| | | | 345/173 |

(Continued)

FOREIGN PATENT DOCUMENTS

| CN | 1595488 A | 3/2005 |
| JP | 2003-98992 A | 4/2003 |

(Continued)

*Primary Examiner* — Chineyere D Wills-Burns
(74) *Attorney, Agent, or Firm* — Winston Hsu

(57) ABSTRACT

A light-emitting diode (LED) display system includes: a computer host, configured to determine a data path layout and a power path layout of the LED display system; a forward device, configured to forward a displayed data of the computer host; and an LED display device, having at least an LED display module, wherein each LED display module includes a connection interface, configured to receive the displayed data and transmit the displayed data to a first LED display module of a plurality of LED display modules to execute the data path layout; a display unit, configured to display the displayed data; a logic unit, configured to receive the displayed data to drive the display unit; and a control unit, configured to control the display unit via the logic unit to determine a scanning frequency or a brightness setting of the display unit.

6 Claims, 8 Drawing Sheets

(56) References Cited

U.S. PATENT DOCUMENTS

| | | | |
|---|---|---|---|
| 2017/0006688 A1* | 1/2017 | Dai et al. | G09G 3/2003 |
| 2017/0193877 A1* | 7/2017 | Lee | G09G 3/3291 |
| 2017/0345363 A1 | 11/2017 | Brooks | |
| 2018/0061903 A1* | 3/2018 | Yang | H01L 27/3241 |
| 2019/0296579 A1* | 9/2019 | Akatsuka | G06F 3/1446 |
| 2020/0004492 A1 | 1/2020 | Kim | |

FOREIGN PATENT DOCUMENTS

| | | |
|---|---|---|
| JP | 2007-166364 A | 6/2007 |
| JP | 2019-170067 A | 10/2019 |
| WO | 2020/008585 A1 | 1/2020 |

\* cited by examiner

LIGHT-EMITTING DIODE DISPLAY SYSTEM AND MODULE

BACKGROUND OF THE INVENTION

1. Field of the Invention

The present invention relates to a light-emitting diode (LED) display system and module, and more particularly, to an LED display system and module capable of simplifying implementations of the LED display system.

2. Description of the Prior Art

A light-emitting diode (LED) display wall consisting of a plurality of LEDs may seamlessly display images which may be expanded to a whole LED display wall. When implementing the conventional LED display wall, the facility and specification of each LED display device must be known, e.g. connection methods of power lines and signal lines and a grouping method of each of the LED display devices. Hardware parameters such as width, height and connection ports of each of the LED display devices are set via operating software according to the connection methods of the power lines and the signal lines of the LED display wall, enabling a transmitter box to transmit correct data to each of the LED display devices. After the correct data are sent to each of the LED display devices, a scanning mode and real height and width of the image and a frame rate are set according to specifications of the LED display devices to display the image correctly. This implementation method is both time-consuming and complicated. Improvements to the prior art are therefore needed.

SUMMARY OF THE INVENTION

The present invention provides a light-emitting diode (LED) display system and module, which simplifies implementations of the LED display system.

An embodiment of the present invention discloses a light-emitting diode (LED) display system, comprising: a computer host, configured to determine a data path layout and a power path layout of the LED display system; a forward device, coupled to the computer host and configured to forward a displayed data of the computer host; and an LED display device, coupled to the forward device, having at least an LED display module, wherein each LED display module comprises: a connection interface, configured to receive the displayed data and transmit the displayed data to a first LED display module of a plurality of LED display modules to execute the data path layout; a display unit, configured to display the displayed data; a logic unit, coupled to the connection interface and configured to receive the displayed data to drive the display unit; a control unit, configured to control the display unit via the logic unit to determine a scanning frequency or a brightness setting of the display unit; and a power unit, configured to connect a power source via a power connection unit, wherein the power source is an alternating current (AC) or a direct current (DC); wherein each of the plurality of LED display modules are connected to each other via the connection interface.

Another embodiment of the present invention discloses a light-emitting diode (LED) display module, comprising: a connection interface, configured to receive a displayed data and transmit the displayed data to another LED display module to execute a data path layout; a display unit, configured to display the displayed data; a logic unit, coupled to the connection interface and configured to receive the displayed data to drive the display unit; a control unit, configured to control the display unit via the logic unit to determine a scanning frequency or a brightness setting of the display unit; and a power unit, configured to connect a power source via a power connection unit, wherein the power source is an alternating current (AC) or a direct current (DC); wherein the data path layout is determined by a computer host.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
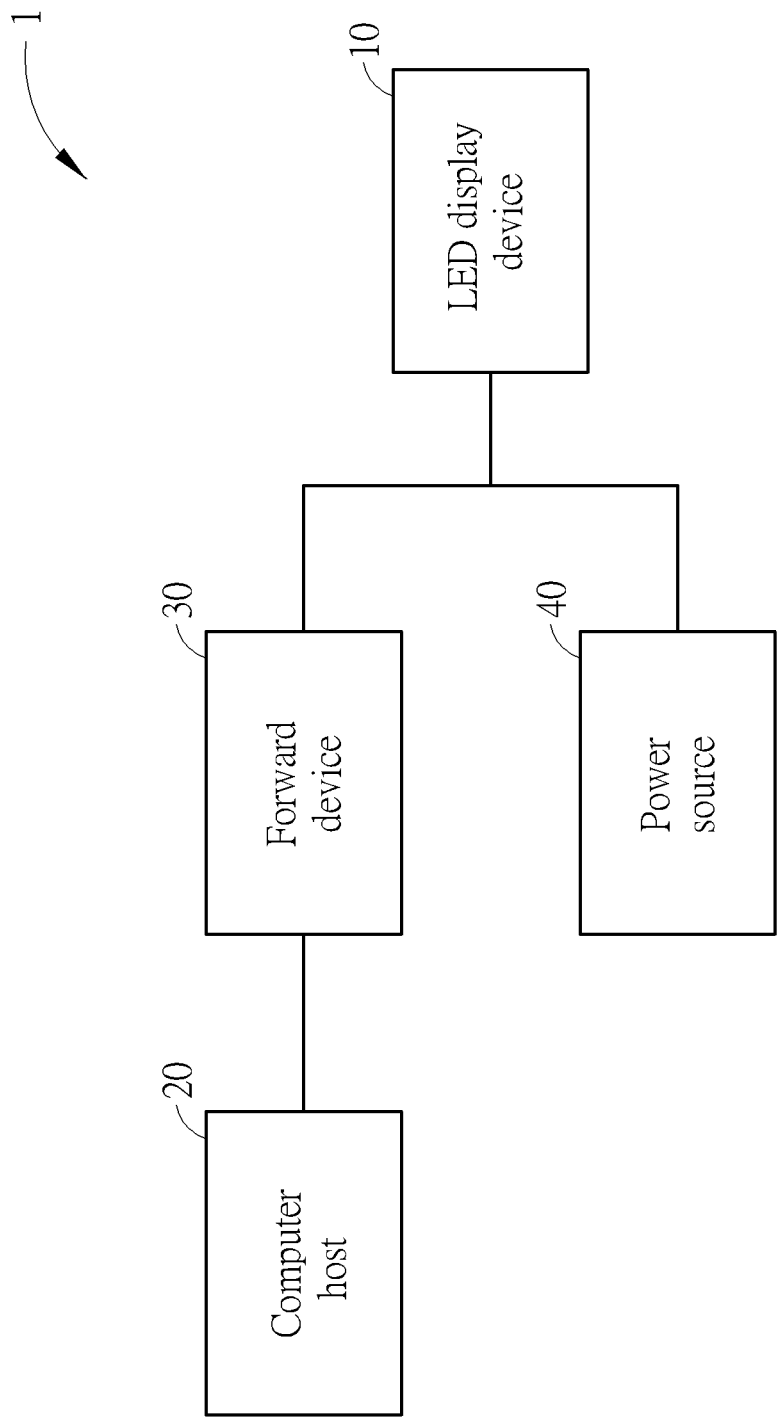
FIG. 1 is a schematic diagram of an LED display system according to an embodiment of the present invention.

Refer to FIG. 1, which is a schematic diagram of a light-emitting diode (LED) display system 1 according to an embodiment of the present invention. The display system 1 includes an LED display device 10, a computer host 20, a forward device 30 and a power source 40. The LED display device 10 may include at least one LED display module, wherein images respectively displayed on each LED display module together constitute a large image. The computer host 20 is utilized for determining a data path layout and a power path layout of the display system 1. The forward device 30 is coupled to the computer host 20 and configured to forward a displayed data from the computer host 20 to transmit the displayed data to the LED display device 10. A universal serial bus (USB) connection device of the forward device 30 may be utilized for implementing the data path layout and the power path layout, or the displayed data may be transmitted to each of the LED display modules of the LED display device 10 via a high definition multimedia interface (HDMI) connection device of the forward device 30. Notably, the displayed data may include corresponding video data, and a number of the LED display modules or an arrangement method of the LED display modules of the LED display device 10 may be arbitrary and without advanced planning or layout. The data path layout and the power path layout determined by the computer host 20 may automatically set hardware parameters corresponding to each of the LED display modules to save on layout time and cost of an LED display wall.

Figure 2:
FIG. 2 is a schematic diagram of an LED display device according to an embodiment of the present invention.

Since the number and arrangement of the LED display modules of the LED display device 10 may be arbitrary, in an embodiment, the LED display device 10 may include LED display modules 10_a-10_i. FIG. 2 is a schematic diagram of the LED display device 10 according to an embodiment of the present invention. Each of the LED display modules 10_a-10_i may be connected to each other via a connecter plug, a wired method or a wireless method, such that data/power transmission interfaces are formed by assembling the data/power access of each of the LED display modules 10_a-10_i. In this way, the data path layout and the power path layout determined by the computer host 20 may be performed to automatically set the hardware parameters corresponding to each of the LED display modules 10_a-10_i.

Figure 3:
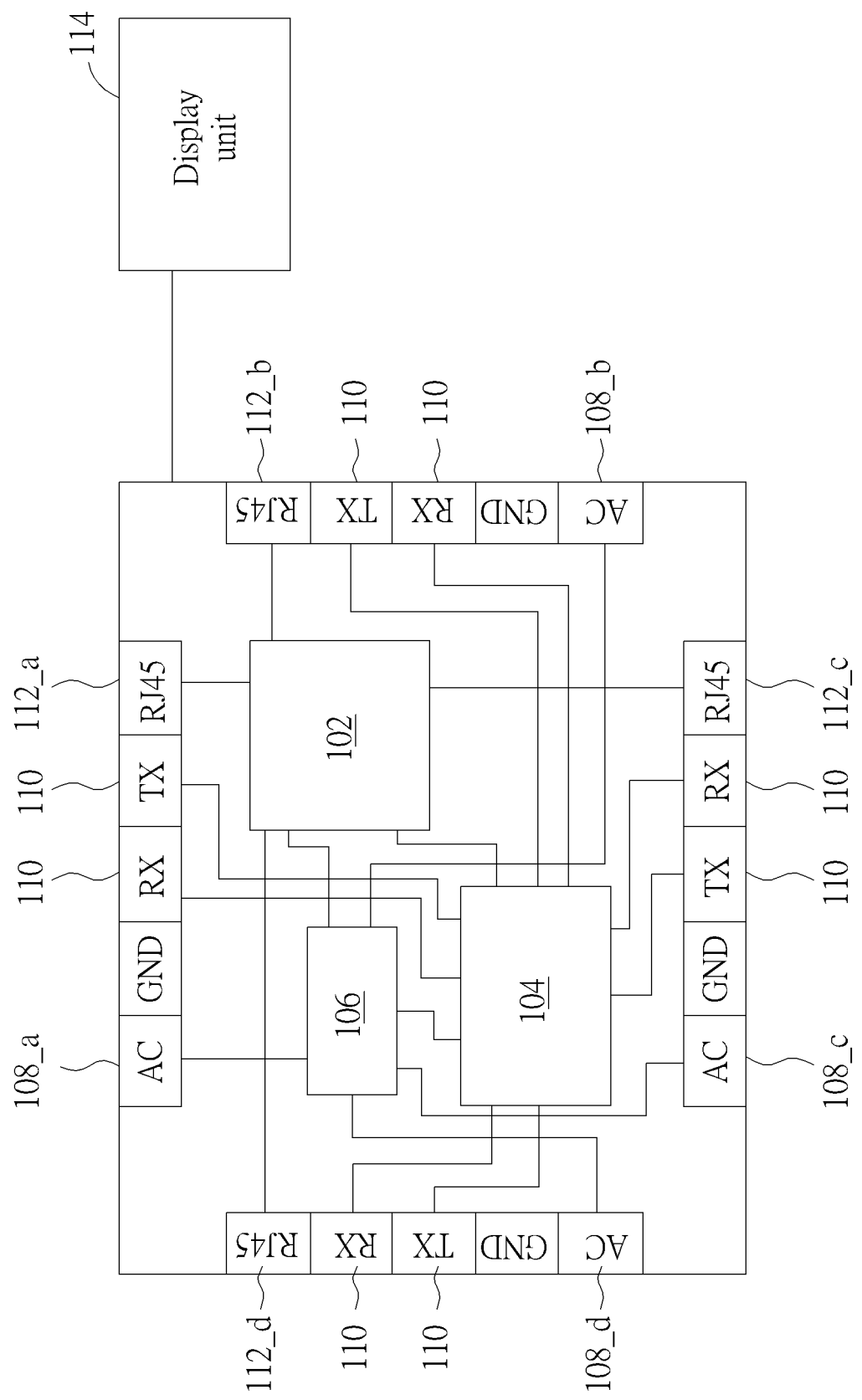
FIG. 3 is a schematic diagram of an LED display module according to an embodiment of the present invention.

Refer to FIG. 3, which is a schematic diagram of the LED display modules 10_a-10_i according to an embodiment of the present invention. Each of the LED display modules 10_a-10_i includes a logic unit 102, a control unit 104, a power unit 106, a power connection unit 108, a communication interface 110, a connection interface 112 and a display unit 114. The logic unit 102 is configured to receive the displayed data and drive the display unit 114 according to the displayed data. The logic unit 102 may be a systems on chip (SoC), a field programmable gate array (FPGA), a central processing unit (CPU) or a combinatorial logic integrated circuit (IC) which can transform the received displayed data, control signals (e.g. displayed brightness contrast or light/dark of the LED), and sensor signals (e.g. signals of a temperature sensor or an LED voltage sensor) into corresponding LED scanning signals to drive the display unit 114.

The control unit 104 is configured to control a scanning frequency, a brightness setting or the displayed data via the logic unit 102, wherein the control unit 104 may be hardware, e.g. a CPU or SoC. In addition, the control unit 104 may be utilized for controlling the power unit 106 to control a timing of the power unit 106 providing the power source to the corresponding LED display modules 10_a-10_i.

The power unit 106 is coupled to the power source 40 via the power connection unit 108, which provides the power source for the LED display modules 10_a-10_i, wherein the power source 40 may be an alternating current (AC) or a direct current (DC). Notably, since the control unit 104 controls the timing of the power unit 106 providing the power source to corresponding LED display modules 10_a-10_i, the control unit 104 may perform conduction or cut off an element connected to the power unit 106 via a switch circuit, so as to manage the timing when executing the power path layout.

The communication interface 110 includes a reception unit RX and a transmitting unit TX which communicate with another LED display module, such as the LED display module 10_a in FIG. 2, which may communicate with the LED display module 10_b via the communication interface 110 or with the LED display module 10_d via the communication interfaces 110, wherein the communication interface 110 may be a universal asynchronous receiver/transmitter (UART) that performs a transmission conversion for the data via serial communication.

The connection interface 112 includes the connection interfaces 112_a-112_d for receiving the displayed/video data, which is then transmitted to another LED display module for executing the data path layout. The connection interfaces 112_a-112_d may respectively connect to multiple LED display modules via an RJ45 interface plug, a wired method or a wireless method, to achieve the data path layout determined by the computer host 20. The display unit 114 may be an LED display panel for displaying the received displayed data, and the logic unit 102 may transform the displayed data into electrical signals to drive the display unit 114.

Figure 4:
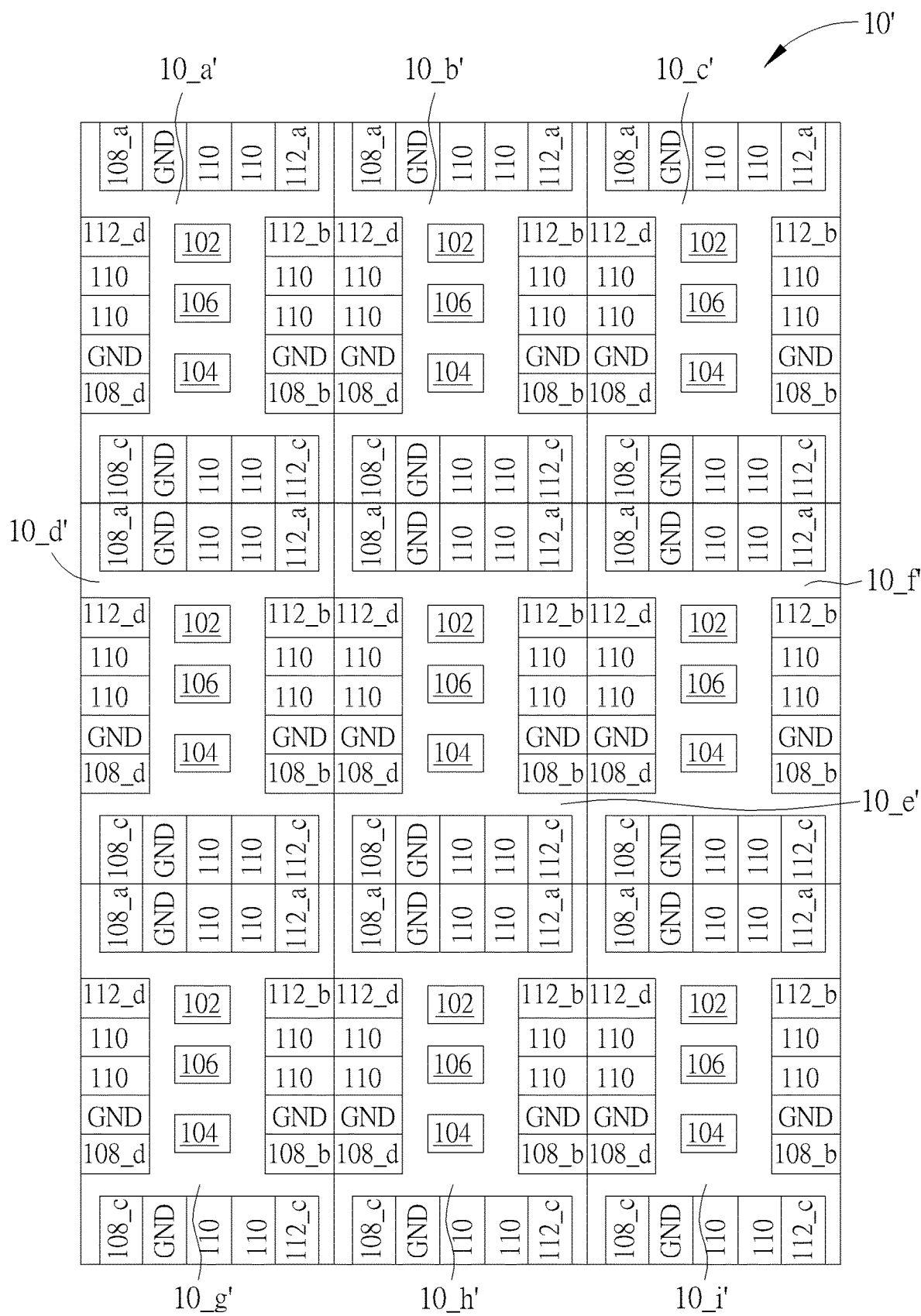
FIG. 4 is a schematic diagram of an LED display device according to another embodiment of the present invention.

In an embodiment, the power connection units 108_a-108_d, the communication interface 110, the connection interfaces 112_a-112_d or ground interface GND may be implemented on four sides of the LED display modules 10_a-10_i, so as to form the large image or power interfaces with other surrounding LED display modules. FIG. 4 is a schematic diagram of an LED display device 10' according to another embodiment of the present invention. The LED display device 10' consists of nine LED display modules 10_a'-10_i', each of the LED display modules 10_a'-10_i' are connected, and power connection units 108_a-108_d, communication interface 110, connection interfaces 112_a-112_d and ground interface GND of each of the LED display modules 10_a'-10_i' are connected. A connection method of the reception unit RX and the transmitting unit TX of the LED display module 10_a' and the LED display module 10_b' may be different from that of the LED display module 10_c', in order to perform transmission conversion of the data. Notably, implementation and number of the power connection units 108_a-108_d, the communication interface 110, the connection interfaces 112_a-112_d or the ground interface GND of the LED display modules 10_a-10_i are not limited to the embodiment illustrated in FIG. 4.

Figure 5:
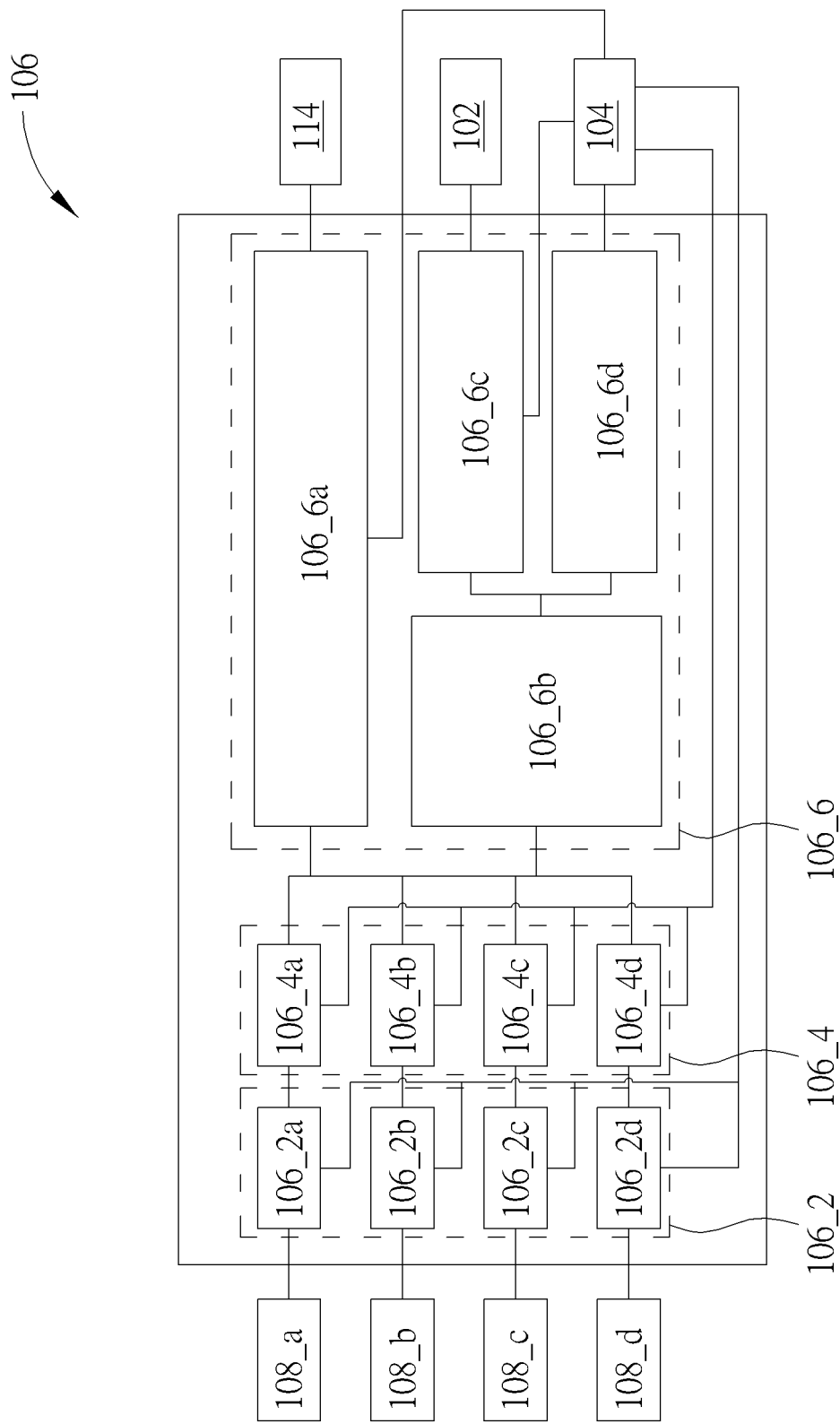
FIG. 5 is a schematic diagram of a power unit of the LED display module according to an embodiment of the present invention.

FIG. 5 is a schematic diagram of the power unit 106 of the LED display modules 10_a-10_i according to an embodiment of the present invention. In order to control the conduction or cut off between elements connected to the power unit 106, the power unit 106 further includes a sensing unit 106_2, a switch unit 106_4 and a voltage transformation module 106_6. The sensing unit 106_2 includes sensing sub-units 106_2a-106_2d, which are coupled to the power source 40 via the power connection units 108_a-108_d, and are configured to sense a current/voltage status of the power source 40. For example, the power connection units 108_a-108_d of one of the LED display modules 10_a-10_i are respectively coupled to the sensing sub-units 106_2a-106_2d of the power unit 106 to sense the current/voltage status of the power source 40.

The switch unit 106_4 includes switch sub-units 106_4a-106_4d, which are respectively coupled to the sensing sub-units 106_2a-106_2d, and the conduction or cut off of the switch sub-units 106_4a-106_4d are controlled by the control unit 104 to execute the power path layout, wherein the switch unit 106_4 may be a relay or other electronic switches. Since the control unit 104 may respectively control the switch sub-units 106_4a-106_4d, the control unit 104 may open the switch sub-units 106_4b, 106_4c to transmit power, which is sensed by the sensing sub-unit 106_2a, to the sensing sub-unit 106_2d.

In addition, the voltage transformation module 106_6 is coupled to the switch unit 106_4, and is configured to provide the power source to the display unit 114, the logic unit 102 and the control unit 104 according to an on/off status of the switch sub-units 106_4a-106_4d of the switch unit 106_4. The voltage transformation module 106_6 includes a first transformation unit 106_6a, a second transformation unit 106_6b, a third transformation unit 106_6c and a fourth transformation unit 106_6d. The first transformation unit 106_6a and the second transformation unit 106_6b are coupled to the switch sub-units 106_4a-106_4d, wherein the first transformation unit 106_6a is utilized for transforming the AC provided by the power source 40 into the DC and provide the DC to the display unit 114. In this example, the first transformation unit 106_6a has an initial status of not outputting the DC to the display unit 114, and the control unit 104 determines whether or not to output the DC to the display unit 114 via the first transformation unit 106_6a. The second transformation unit 106_6b is utilized for transforming the AC provided by the power source 40 into DC and then providing the DC to the logic unit 102 and the control unit 104. In addition, the third transformation unit 106_6c and the fourth transformation unit 106_6d are coupled to the second transformation unit 106_6b for executing DC to DC conversion, so as to respectively provide the DC to the logic unit 102 and the control unit 104. In this example, the third transformation unit 106_6c has an initial status of not outputting the DC to the logic unit 102, and the control unit 104 determines whether or not to output the DC via the third transformation unit 106_6c. The fourth transformation unit 106_6d has an initial status of outputting the DC to the control unit 104.

Notably, the above embodiment illustrates that the power source 40 provides the AC. In other embodiments, the power source 40 provides the DC, which also belongs to the scope of the present invention.

Since the display unit 114 of each of the LED display modules 10_a-10_i respectively has a corresponding specific identification (ID), the computer host 20 may establish an LED display module layout table according to the specific ID of each of the LED display modules 10_a-10_i. For example, when the power source 40 is transmitted to the LED display module 10_a of the LED display device 10, the power unit 106 only provides the power source to the control unit 104, and the LED display module 10_a returns its specific ID to the computer host 20. Then, the computer host 20 asks whether other LED display modules exist surrounding the LED display module 10_a via the forward device 30. In an embodiment, after the LED display module 10_a receives a command from the computer host 20, which asks for responses from the surrounding modules of the LED display module 10_a, the LED display module 10_a obtains specific IDs of the LED display module 10_b and the LED display module 10_d and replies to the computer host 20 that the LED display module 10_b and the LED display module 10_d exist surrounding the LED display module 10_a. Similarly, the computer host 20 continues to ask whether other LED display modules exist surrounding the LED display module 10_b and the LED display module 10_d in order to establish the LED display module layout table, as shown in Table 1.

TABLE 1

| 10_a | 10_b | 10_c |
| 10_d | 10_e | 10_f |
| 10_g | 10_h | 10_i |

After establishing the LED display module layout table, the computer host 20 obtains the current/voltage status of the power source 40 from the sensing unit 106_2 of the power unit 106 of each of the LED display modules according to the LED display module layout table. When the LED display module layout is as in the embodiment shown in the table 1, the input accesses of the AC of the power source 40 are the LED display modules 10_a, 10_d and 10_g, i.e. there is even power allocation. The computer host 20 may evenly allocate the power source to the LED display modules 10_a, 10_d and 10_g accordingly. In another embodiment, a horizontal/vertical arrangement method of the LED display module may be implemented for power source allocation, but this is not limited thereto.

Figure 6:
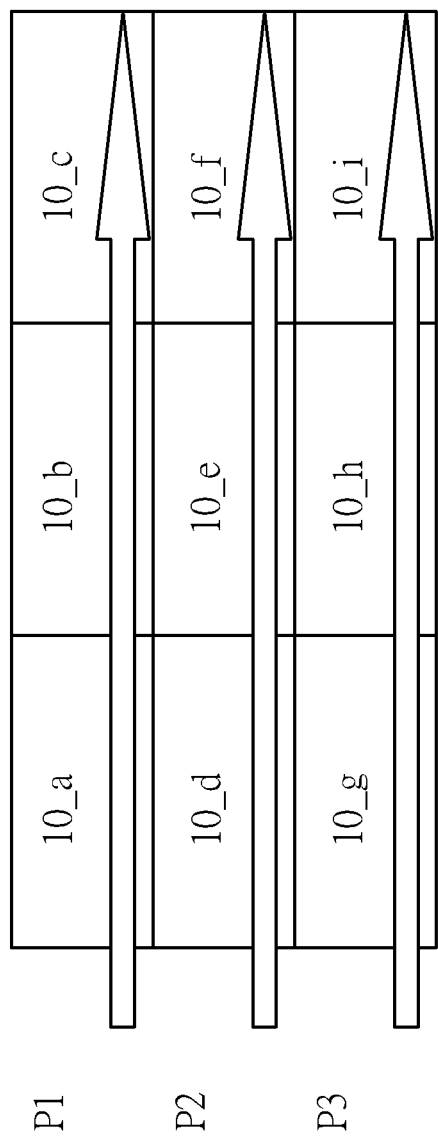
FIG. 6 is a schematic diagram of a power path layout according to an embodiment of the present invention.

In this example, when the computer host 20 evenly allocates the power source to the LED display modules 10_a, 10_d and 10_g, i.e. the power path layout in FIG. 6 may be implemented. When the power path layout of the LED display device is as in the embodiment shown in the FIG. 6, there is a power path P1 from the LED display module 10_a to the LED display module 10_c, a power path P2 from the LED display module 10_d to the LED display module 10_f, and a power path P3 from the LED display module 10_g to the LED display module 10_i. The computer host 20 is required to cut off power connections between the LED display module 10_a and the LED display module 10_d, between the LED display module 10_b and the LED display module 10_e, and between the LED display module 10_c and the LED display module 10_f, such that power connections between the power path P1 and the power path P2 are cut off. In addition, the computer host 20 is required to cut off power connections between the LED display module 10_d and the LED display module 10_g, between the LED display module 10_e and the LED display module 10_h, and between the LED display module 10_f and the LED display module 10_i, such that power connections between the power path P2 and the power path P3 are cut off.

In this situation, the computer host 20 cuts off the corresponding switch unit 106_4 of the LED display module to finish the power path layout. For example, the computer host 20 may open the switch sub-unit 106_4c of the LED display module 10_a and the switch sub-unit 106_4a of the LED display module 10_d via the control unit 104 to cut off the power connection between the LED display module 10_a and the LED display module 10_d. Alternatively, the computer host 20 may open the switch sub-unit 106_4c of the LED display module 10_e and the switch sub-unit 106_4a of the LED display module 10_h via the control unit 104 to cut off the power connection between the LED display module 10_e and the LED display module 10_h, and so forth, to finish the power path layout.

Figure 7:
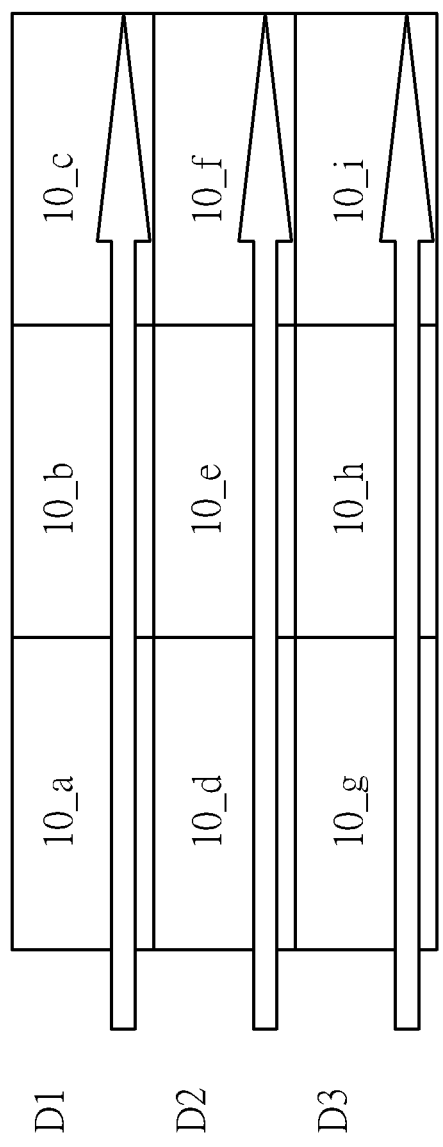
FIG. 7 is a schematic diagram of a data path layout according to an embodiment of the present invention.

The computer host 20 may determine the data path layout of the LED display device 10 according to the LED display module layout table. For example, the computer host 20 may allocate the data path according to a complete rectangular area of the LED display device 10 or a horizontal/vertical arrangement method of the LED display module. Therefore, when the data path layout of the LED display device is as in the embodiment shown in FIG. 7, the connection interface 112_b of the LED display module 10_a forwards the displayed data to the LED display module 10_b via the connection interface 112_d of the LED display module 10_b, and then the displayed data is forwarded to the LED display module 10_c via the connection interface 112_d of the LED display module 10_c to complete a data path D1. As can be known from the LED display module layout table, the LED display module 10_c is the last of the data path D1; thus, the LED display module 10_c is not required to forward any data. Similarly, data paths D2, D3 may be implemented to complete the data path layout with the same method.

As to parameter settings of each of the LED display modules, the computer host 20 may ask the control unit 104 and specific ID of the display unit 114 of each of the LED display modules, such that the control unit 104 may output correct displayed data and setting values accordingly. For example, when a resolution of the display unit 114 is 120*120, each pixel color has 8 bits and a scanning frequency supported by the display unit 114 is 120 Hz. The computer host 20 may thereby determine that the total resolution of the LED display device 10 is 360*360, and transmit the displayed data with a best resolution of 360*360 at the scanning frequency of 120 Hz.

Figure 8:
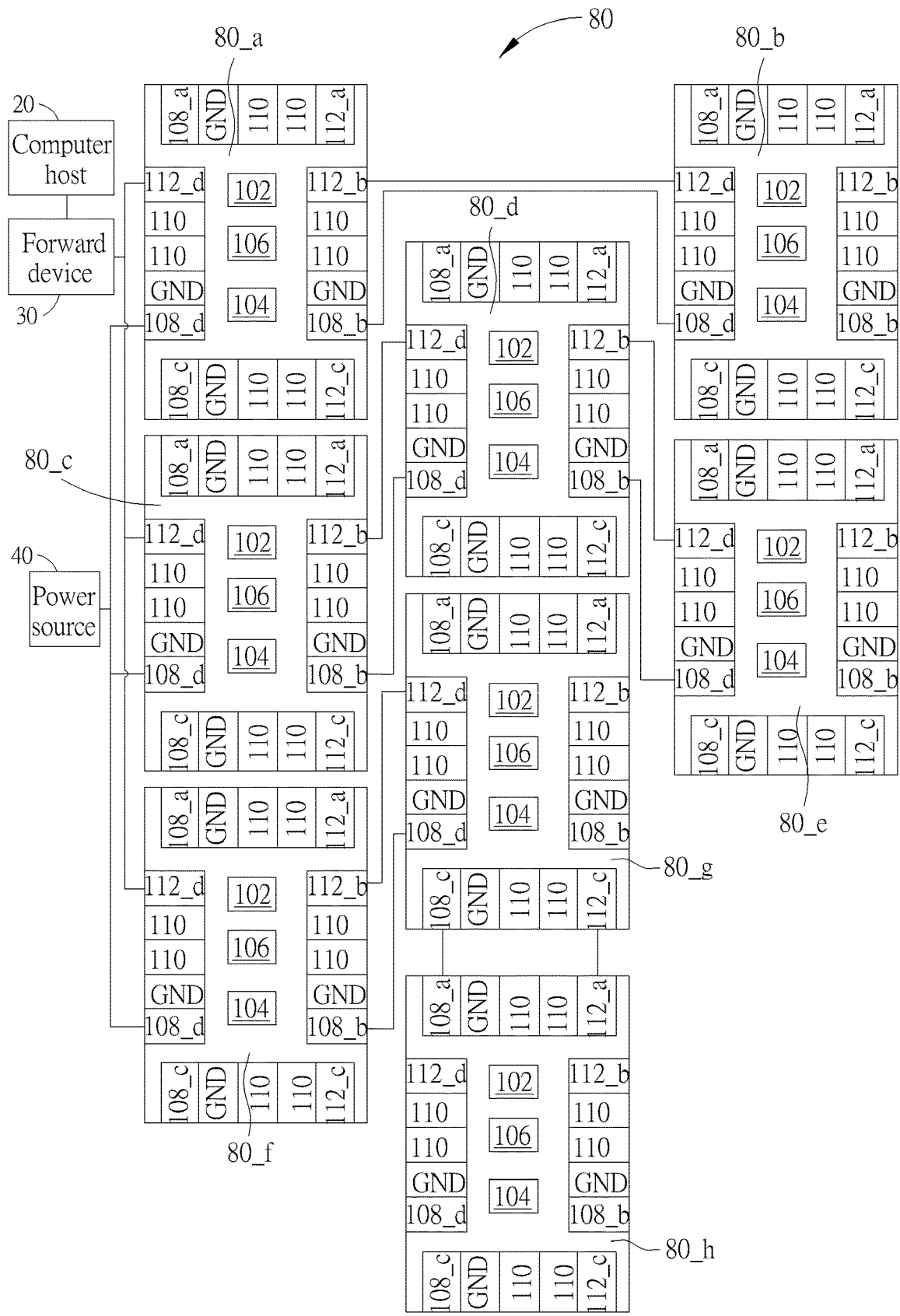
FIG. 8 is a schematic diagram of an LED display system according to another embodiment of the present invention.

Refer to FIG. 8, which is a schematic diagram of an LED display system 8 according to another embodiment of the present invention. Since the LED display system 8 is similar to the display system 1, the LED display system 8 shares identical reference signs with the same function. With an arbitrary layout of LED display modules 80_a-80_h, after a data path layout and a power path layout of the LED display system 8 are determined, the computer host 20 may ask the connection interface 112 of each of the LED display modules 80_a-80_h via the forward device 30 to obtain an LED display module layout table of the LED display system 8, as shown in Table 2.

TABLE 2

| 10_a | 10_b | N/A  |
|------|------|------|
| 10_c | 10_d | 10_e |
| 10_f | 10_g | 10_h |

In this example, the connection interface 112 is RJ45 and every element of the power unit 106 must be conducted to obtain the LED display module layout table of the LED display system 8. As such, the computer host 20 may determine a best resolution and scanning frequency of the displayed data according to the resolution of the display unit 114, the bit number of each pixel color and the scanning frequency supported by the display unit 114, and then transmit the best resolution and scanning frequency of the displayed data to each of the LED display modules 80_a-80_h of the LED display device.

Notably, those skilled in the art may design the LED display system according to different requirements. For example, the arrangement method of the LED display modules, the connection method between the LED display modules, and implementation strategies of the data path layout and the power path layout may all be adjusted according to different requirements, and all these belong to the scope of the present invention.

In summary, the present invention provides an LED display system and module to simplify implementation of the LED display system by modulizing the LED display system. As this implementation does not require advance planning and layouts, and automatically executes power and data path layout and sets hardware parameters, the setting time is saved and convenience is improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A light-emitting diode (LED) display system, comprising:
  a computer host, configured to determine a data path layout and a power path layout of the LED display system;
  a forward device, coupled to the computer host and configured to forward a displayed data of the computer host; and
  an LED display device, coupled to the forward device, having at least an LED display module, wherein each LED display module comprises:
    a connection interface, configured to receive the displayed data and transmit the displayed data to a first LED display module of a plurality of LED display modules to execute the data path layout;
    a display unit, configured to display the displayed data;
    a logic unit, coupled to the connection interface and configured to receive the displayed data to drive the display unit;
    a control unit, configured to control the display unit via the logic unit to determine a scanning frequency or a brightness setting of the display unit;
    a power unit, configured to connect a power source via a power connection unit, wherein the power source is an alternating current (AC) or a direct current (DC); and
    a switch unit, configured to be conducted or cut off by the control unit to execute the power path layout;
    wherein each of the plurality of LED display modules are connected to each other via the connection interface;
    wherein the display unit of each LED display module has a specific identification (ID);
    wherein the computer host is configured to establish an LED display module layout table according to the specific ID of the display unit of each LED display module;
    Wherein the computer host may ask the connection interface of each of the LED display modules via the forward device to obtain the LED display module layout table of the LED display system.

2. The LED display system of claim 1, wherein each of the plurality of LED display modules further comprises:
  a communication interface, having a reception unit and a transmitting unit, to communicate with another LED display module.

3. The LED display system of claim 1, wherein the connection interface of each LED display module is a connection plug to connect the remaining LED display modules of the plurality of LED display modules via a wired connection method.

4. A light-emitting diode (LED) display module, comprising:
  a connection interface, configured to receive a displayed data and transmit the displayed data to another LED display module to execute a data path layout;
  a display unit, configured to display the displayed data;
  a logic unit, coupled to the connection interface and configured to receive the displayed data to drive the display unit;
  a control unit, configured to control the display unit via the logic unit to determine a scanning frequency or a brightness setting of the display unit;
  a power unit, configured to connect a power source via a power connection unit, wherein the power source is an alternating current (AC) or a direct current (DC); and
  a switch unit, configured to be conducted or cut off by the control unit to execute a power path layout;
  wherein the data path layout is determined by a computer host;
  wherein the display unit has a specific identification (ID);
  wherein the computer host is configured to establish an LED display module layout table according to the specific ID of the display unit;
    Wherein the computer host may ask the connection interface of each of the LED display modules via the forward device to obtain the LED display module layout table of the LED display system.

5. The LED display module of claim 4, further comprising:
   a communication interface, having a reception unit and a transmitting unit, to communicate with another LED display module.

6. The LED display module of claim 4, wherein the connection interface is a connection plug to connect another LED display module via a wired connection method.

* * * * *